United States Patent [19]

Fukuda et al.

[11] Patent Number: 4,865,898

[45] Date of Patent: Sep. 12, 1989

[54] POLYESTER FILM FOR MAGNETIC RECORDING MEDIA

[75] Inventors: Yujiro Fukuda, Machida; Shigeo Utsumi; Kichinojyo Tomitaka, both of Yokohama; Toshifumi Takisawa, Tokyo, all of Japan

[73] Assignee: Diafoil Company, Limited, Tokyo, Japan

[21] Appl. No.: 84,462

[22] Filed: Aug. 12, 1987

[30] Foreign Application Priority Data

Aug. 12, 1986 [JP] Japan ................. 61-188937

[51] Int. Cl.$^4$ ............................................ B32B 27/36
[52] U.S. Cl. .................................. 428/141; 428/143; 428/323; 428/480; 428/694; 428/900
[58] Field of Search ............... 428/141, 694, 900, 323, 428/480, 143; 427/128

[56] References Cited

U.S. PATENT DOCUMENTS

| | | | |
|---|---|---|---|
| 4,603,073 | 7/1986 | Renalls et al. | 428/141 |
| 4,680,217 | 7/1987 | Kanesaki et al. | 428/694 |

FOREIGN PATENT DOCUMENTS

| | | |
|---|---|---|
| 2242417 | 3/1975 | France . |
| 51-52808 | 5/1976 | Japan . |
| 53-30447 | 3/1978 | Japan . |
| 56-19524 | 2/1981 | Japan . |
| 58-168526 | 10/1983 | Japan . |
| 59-71357 | 4/1984 | Japan . |
| 59-186124 | 10/1984 | Japan . |
| 60-163229 | 8/1985 | Japan . |
| 61-154924 | 7/1986 | Japan . |
| 61-237622 | 10/1986 | Japan . |

Primary Examiner—Paul J. Thibodeau
Attorney, Agent, or Firm—Oblon, Spivak, McClelland, Maier & Neustadt

[57] ABSTRACT

Disclosed herein is a biaxially oriented polyester film for magnetic recording media, containing uniformly carbon black particles and having the following specific properties:

$$T_{900} \leq 50\% \qquad (1)$$

$$0.003 \ \mu m \leq Ra \leq 0.025 \ \mu m \qquad (2)$$

$$n_1 \leq \min\left(40 \log \frac{80}{T_{900}} \text{ or } 80\right) \qquad (3)$$

$$n_2 \leq 10 \qquad (4)$$

wherein $T_{900}$ represents a light transmittance of the film at a wavelength of 900 nm, Ra represents an average surface roughness of the film $n_1$ represents the number of protuberances of 0.81 to 1.08 $\mu m$ in height existing on the surface of the film per film area of 25 cm$^2$, and $n_2$ represents the number of protuberances of more than 1.08 $\mu m$ in height existing on the surface of the film per film area of 25 cm$^2$.

11 Claims, 1 Drawing Sheet

POLYESTER FILM FOR MAGNETIC RECORDING MEDIA

BACKGROUND OF THE INVENTION

The present invention relates to a polyester film for magnetic recording media and, particularly, to a polyester film for magnetic recording media which is excellent in adhesiveness, light-shielding property, durability and electromagnetic transducing property. More in detail, the present invention relates to a biaxially oriented polyester film for magnetic recording media, containing uniformly carbon black particles in the film and having the following specific properties:

$$T_{900} \leq 50\% \quad (1)$$

$$0.003 \, \mu m \leq Ra \leq 0.025 \, \mu m \quad (2)$$

$$n_1 \leq \min \left( 40 \log \frac{80}{T_{900}} \text{ or } 80 \right) \quad (3)$$

$$n_2 \leq 10 \quad (4)$$

wherein $T_{900}$ represents a light transmittance of the film at a wavelength of 900 nm, Ra represents an average surface roughness of the film, n1 represents the number of protuberances of 0.81 to 1.08 $\mu m$ in height existing on the surface of the film per film area of 25 cm$^2$, and $n_2$ represents the number of protuberances of more than 1.08 $\mu m$ in height existing on the surface of the film per film area of 25 cm$^2$.

Polyester films have hitherto been widely used as base films for magnetic recording media such as floppy disks and magnetic tapes because of their excellent strength and chemical resistance, etc. With the rapid progress in the recording density of magnetic recording media, a base film for such recording media, in particular, floppy disks has recently been strongly demanded to have a thinner magnetic layer. Most of floppy disks and magnetic tapes are generally mechanically positioned by optically detecting index holes or reading tapes, so that they are required to have an excellent light-shielding property. However, if a magnetic layer is made thinner in the case where a transparent polyester film is used as a base film, the light-shielding property is disadvantageously lowered together with the reduction in thickness of the magnetic layer. On the other hand, if the amount of carbon black in the magnetic layer is increased in order to maintain the light-shielding property, the durability is disadvantageously lowered. Thus, achievement of a thinner magnetic layer has been difficult.

To solve these problems, a method of uniformly dispersing carbon black particles in a film, thereby both enhancing the adhesiveness between the film and the magnetic layer and endowing a high light-shielding property to the base film itself has conventionally been tried. Carbon black particles, however, have strong cohesiveness, and the aggregates are apt to form coarse protuberances on the surface of the film, so that it is difficult to obtain a high electromagnetic transducing property. This attempt has, therefore, been abandoned because it cannot attain the intended object of producing a high-density magnetic recording media. As a countermeasure, a three-layered film composed of a carbon black layer having a light-shielding property and a layer having no light-shielding property provided on both sides of the carbon black layer, has been proposed. A method of producing such a three-layered film, however, has the disadvantages that it necessitates a novel equipment such as a co-extruding device; the use as the starting material of a recycled film is difficult, resulting in rise in the cost; and mass production is difficult.

Therefore, the offering of a single-layer base film, not a multi-layer base film, for magnetic recording media which has excellent adhesiveness, light-shielding property and durability, and which is capable of endowing a high electromagnetic transducing property has become necessary.

As a result of researches on the above-described problems, it has been found by the present inventors that by finely dispersing carbon black in the film and restricting the light transmittance of the film, its average surface roughness, and the number of coarse protuberances of a specific height existing on the surface of the film within a specific range the produced base film for magnetic recording media has excellent adhesiveness, light-shielding property and durability, and is capable of endowing a high electromagnetic transducing property in the form of a single layer.

SUMMARY OF THE INVENTION

In an aspect of the present invention, there is provided a biaxially oriented polyester film for magnetic recording media, containing uniformly dispersed carbon black particles and having the following specific properties:

$$T_{900} \leq 50\% \quad (1)$$

$$0.003 \, \mu m \leq Ra \leq 0.025 \, \mu m \quad (2)$$

$$n_1 = \text{not more than the lesser of} \left( 40 \log \frac{80}{T_{900}} \text{ or } 80 \right) \quad (3)$$

$$n_2 \leq 10 \quad (4)$$

wherein $T_{900}$ represents the light transmittance of the film at a wavelength of 900 nm, Ra represents the average surface roughness of the film, $n_1$ represents the number of protuberances of 0.81 to 1.08 $\mu m$ in height existing on the surface of the film per film area of 25 cm$^2$, and $n_2$ represents the number of protuberances of more than 1.08 $\mu m$ in height existing on the surface of the film per film area of 25 cm$^2$.

BRIEF DESCRIPTION OF THE DRAWING

The FIGURE shows the relationship between $n_1$ and $T_{900}$ of the polyester films obtained in Examples and Comparative Examples. The mark "o" represents Example, the mark "x" represents Comparative Example, and the hatched portion is a part within the scope of claims. The number under each mark represents the number of Example or Comparative Example.

DETAILED DESCRIPTION OF THE INVENTION

Figure 1:
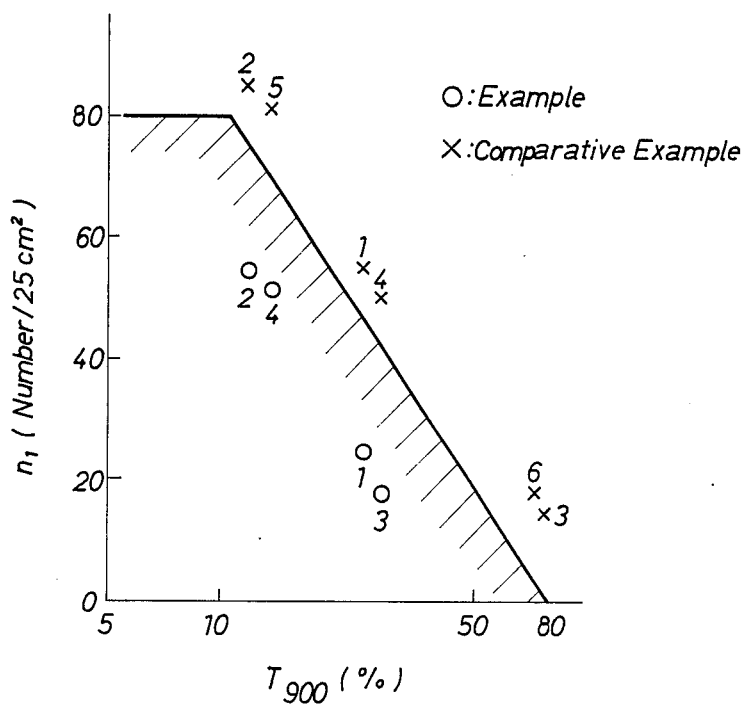

The feature of the present invention lies in a biaxially oriented polyester film for magnetic recording media containing uniformly dispersed carbon black particles in the film and having the following characteristics:

$$T_{900} \leq 50\% \quad (1)$$

$$0.003 \ \mu m \leq Ra \leq 0.025 \ \mu m \qquad (2)$$

$$n_1 = \text{not more than the lesser of } \left( 40 \log \frac{80}{T_{900}} \text{ or } 80 \right) \qquad (3)$$

$$n_2 \leq 10 \qquad (4)$$

wherein $T_{900}$ represents the light transmittance of the film at a wavelength of 900 nm, Ra represents the average surface roughness of the film, $n_1$ represents the number of protuberances of 0.81 to 1.08 μm in height existing on the surface of the film per film area of 25 cm², and $n_2$ represents the number of protuberances of more than 1.08 μm in height existing on the surface of the film per film area of 25 cm².

The polyester in the present invention is a polymer obtained by polycondensation of an aromatic dicarboxylic acid such as terephthalic acid, isophthalic acid and naphthalene-2,6-dicarboxylic acid or ester thereof, and a glycol such as ethylene glycol, diethylene glycol, tetramethylene glycol and neopentyl glycol.

The polyester may be obtained (1) by directly polycondensing an aromatic dicarboxylic acid and a glycol, (2) by subjecting a dialkyl ester of an aromatic dicarboxylic acid and a glycol to ester-exchange-reaction and polycondensing the resultant product, or (3) by polycondensating of a diglycol ester of an aromatic dicarboxylic acid. The typical examples of the polymer are polyethylene terephthalate and polyethylene-2,6-naphthalene dicarboxylate. The polymer may be a polyester in which not more than 15 mol % of the dicarboxylic acid component is a non-aromatic dicarboxylic acid, and/or not more than 15% of the diol component is a diol component other than an aromatic glycol.

In addition, the polyester in the present invention may be a polymer blend with another polymer. As other polymers which may be blended therewith are exemplified by polyamide, polyolefin, and other kind of polyesters (including polycarbonate).

It is preferable to incorporate a polyalkylene glycol into a polyester film in order to improve the adhesiveness of the magnetic layer or a deposited layer to a film. As examples of polyalkylene glycols, polyethylene glycol, polytetramethylene glycol and polypropylene glycol may be exemplified. In order to incorporate such a polyalkylene glycol into the polyester film, any method may be adopted, for example, a method of adding a polyalkylene glycol during ester exchange or polymerization, a method of blending a polyalkylene glycol with the polyester, a method of adding a polyalkylene glycol during drying the polyester, or a method of incorporating a polyalkylene glycol into a raw material polyester during extrusion of the polyester.

The polyester may contain an additive such as a stabilizer, coloring agent, anti-oxidant and anti-forming agent as occasion demands.

It is necessary that carbon black particles are contained in the polyester in order to improve the adhesiveness and the light-shielding property of a film. The kind of carbon black is not specified, but lamp black, thermal black, furnace black, acetylene black, etc. are preferable. The size of the carbon black particles is not restricted, but it is preferably 10 to 30 nm, more preferably 10 to 20 nm. If the average particle diameter exceeds 30 nm, the particles tends to unfavorably form a very large aggregate, which is apt to form a coarse protuberance on the surface of the film. On the other hand, if the average particle diameter is less than 10 nm, the surface energy of the particles increases, so that a large aggregate is also apt to be formed. The content of carbon black particles is not specified, but preferably 0.05 to 5 wt %, more preferably 0.1 to 3 wt % of carbon black is contained in order to obtain a sufficient adhesiveness and light-shielding property. If the carbon black content is less than 0.05 wt %, very excellent light-shielding property and adhesiveness of the film is not expected. On the other hand, if it exceeds 5 wt %, there is an unfavorable tendency to a rapid increase in the coarse protuberances on the surface of the film. As a method of incorporating carbon black particles into a film, any method may be adopted, for example, a method of adding carbon black particles during or after polymerization, a method of adding carbon black particles during drying the polyester, or a method of incorporating carbon black particles into a raw material polyester during extrusion of the polyester. Above all, a method of producing a master batch containing a high concentration of carbon black and blending the master batch with the other raw material polyester before or after drying to obtain a film having a desired concentration of carbon black, is preferable. The concentration of carbon black in the master batch at this time is preferably 0.2 to 30 wt %, more preferably 0.5 to 25 wt %. If the concentration of carbon black in the master batch exceeds 30 wt %, it is difficult to prevent cohesion of carbon black particles during forming the master batch, even if the carbon black particles used has a good dispersing property. If the concentration of carbon black in the master batch is less than 0.2 wt %, the master batch occupies a large part in the composition at the time of blending, thereby unfavorably reducing the degree of freedom in blending other materials.

It is preferable that the material is passed through a filter both in the extrusion step at the time of producing a master batch, and at the time of film-formation. Such a filter used at the time of production of a master batch and film-formation is preferably of approximately 1,000 mesh or a finer mesh.

It is also preferable to add a dispersant in order to improve the dispersing property of the carbon black particles. The kind of dispersant is not specified, but higher fatty acids having not less than 16 carbon atoms and/or the derivatives thereof, polyvinyl pyrrolidone, epoxidized polybutadiene, and the sodium salt of sulfonated naphthalene may be exemplified as preferred examples of dispersants. The amount of dispersant to be added is not restricted, but it is 0 to 10,000 ppm, preferably 0 to 5,000 ppm.

Carbon black particles endow adhesiveness and slipping property to the film, but it is preferable to further add inert inorganic particles other than carbon black particles in order to endow more excellent adhesiveness and slipping property to the film.

As the inert inorganic particles are used inorganic external particles of a salt or an oxide which contains an element selected from those in the Group I, Group II, Group III and Group IV of the periodic table, e.g., kaolin, clay, calcium carbonate, silicon oxide, calcium terephthalate, aluminum oxide, calcium phosphate, and titanium oxide; and inner particles formed within a polymer when a polyester is formed, by a high-melting point organic compound which is insoluble when a polyester resin is melted for film-formation, and a catalyst of a metal compound, e.g., an alkali metal compound and an alkali earth metal compound, which is used at the time of synthesizing a cross-linked polymer and a polyester.

The average particle diameter of the inert inorganic particles is not restricted, but it is preferably 0.05 to 5 μm, more preferably 0.1 to 3 μm. As the inert inorganic particles, titanium oxide is preferable because it is so excellent in the dispersing property with carbon black particles as to produce a uniform film surface, thereby endowing the light-shielding property of the film and making it possible to reduce the carbon black content by that degree. The average particle diameter of the titanium oxide particles is preferably 0.05 to 3 μm, more preferably 0.1 to 1 μm.

It is also preferable to add an organic lubricant in order to further enhance the slipping property of the film. The kind of the organic lubricant is not restricted, and an aliphatic compound, fatty acid ester, alkylene bisaliphatic compound, and/or aromatic amide may be exemplified as examples thereof. As the aliphatic compound, a compound having a multiplicity of carbon atoms such as montanic acid is preferable. As the aliphatic ester, EG ester of montanic acid may be mentioned. As the alkylene bisaliphatic compound and/or aromatic amide, hexamethylene bisbehenamide, hexamethylene bisstearylamide, and N,N'-distearylamide may be exemplified. The content of the organic lubricant in the film is not specified, but it is ordinarily 0 to 10,000 ppm, preferably 0 to 5,000 ppm. Too large an amount of lubricant unfavorably lowers the adhesiveness of the film at the time of deposition or coating.

It is necessary that the light transmittance ($T_{900}$) of the film of the present invention at a wavelength of 900 nm is not more than 50%, preferably not more than 30%. Light used for optically detecting the index holes or the like of a floppy disk is mainly near-infrared rays of a wavelength of approximately 900 nm. In order to detect the position of the index holes or the like without a detection error, it is preferable that the light transmittance ($T_{900}$) of a magnetic recording medium itself such as a magnetic tape and a floppy disk which comprises a base film and a magnetic layer placed thereon, is not more than 1%. If the light transmittance ($T_{900}$) of the base film exceeds 50%, the magnetic layer must contain a large amount of carbon black particles in order to restrict the transmittance ($T_{900}$) of the laminated portion of the base film and the magnetic layer to not more than 1%, whereby the modulus of elasticity, elongation, etc. of the magnetic layer is lowered, thereby greatly deteriorating the durability of the magnetic layer.

The average surface roughness (Ra) of a film of the present invention must be in the range of 0.003 to 0.025 μm, preferably 0.005 to 0.02 μm. If the average surface roughness (Ra) of a film is less than 0.003 μm, the adhesiveness and slipping property of the film are unfavorably lowered and, hence, deteriorates the durability of the product thereof such as a magnetic tape and a floppy disk. On the other hand, if the average surface roughness (Ra) of a film exceeds 0.025 μm, it is difficult to obtain a good electromagnetic transducing property.

The surface roughness (Ra) of a film containing carbon black particles generally depends upon the content, particle diameter and dispersing property of the particles as well as the surface roughness of a film containing other inorganic particles. In the present invention, the smallest necessary amount of carbon black particles is almost determined by the light-shielding property, so that the surface roughness (Ra) is influenced by the particle diameter and the dispersing property of the black carbon particles. Since carbon black particles have a very strong cohesiveness, and are apt to form secondary particles, how finely to disperse the particles at the time of kneading or melt extrusion is important in order to control Ra to a low value.

The electromagnetic transducing property of a floppy disk, magnetic tape, etc. not only depends on the surface roughness (Ra) of a base film but is largely influenced by the number of coarse protuberances on the film surface. In a film containing carbon black particles, protuberances are likely to be formed on the film surface due to the strong cohesiveness of the carbon black particles. As a result of investigations by the present inventors, it has been found that the number (n) of coarse protuberances is proportional to the concentration (c)(wt %) of carbon black if the raw material and the film-forming conditions are the same.

This means that it is ordinarily necessary to control the number (n) of coarse protuberance to a small value in order to obtain a good electromagnetic transducing property and, hence, to decrease the carbon black concentration (c) in the base film. However, if the carbon black concentration (c) is decreased, the light-shielding property the base film is lowered. It is, therefore, necessary to increase the content of carbon black particles not in the base film but in the magnetic layer in order to maintain the light-shielding property, which brings about another defect that the durability of the magnetic layer is greatly deteriorated.

As a result of studies on how to solve the above-described antinomic problems, the present inventors have found that it is possible to obtain a base film for magnetic recording media which has excellent electromagnetic transducing property, adhesiveness, durability, and light-shielding property even in the form of a single layer only in the case where certain specific conditions are satisfied, in other words, in the case where the number ($n_1$) of protuberances of 0.81 to 1.08 in height existing on the surface of a film per area of 25 cm$^2$ and the light transmittance ($T_{900}$%) of the film at a wavelength of 900 nm satisfy the relationship represented by the following formula (3'):

$$n_1 = \text{not more than the lesser of} \left( n_0 \log \frac{80}{T_{900}} \text{ or } 80 \right) \quad (3')$$

preferably the following relationship:

$$n_1 = \text{not more than the lesser of} \left( n_0 \log \frac{80}{T_{900}} \text{ or } 60 \right)$$

and the number ($n_2$) of protuberances of more than 1.08 in height existing on the surface of a film per area of 25 cm$^2$ is not more than 10, preferably not more than 5, and more preferably not more than 2.

In the formula (3'), the right-hand side means that either of the terms [$n_0 \log 80/T_{900}$] or [80] that takes a smaller value satisfies the formula (3'), and $n_0=40$, preferably $n_0=30$. If the number ($n_1$) of protuberances of 0.81 to 1.08 μm in height exceeds the value of the right-hand side of the formula (3'), a plurality of the coarse protuberances concentrate on one part, which often leads to the separation of the magnetic layer, nonuniformity in coating, etc. As a result, the durability and electromagnetic transducing property of the product are unfavorably greatly lowered. $T_{900}$ in the right-hand side of the formula (3') means that it is possible to decrease the carbon black content in the magnetic layer if the light transmittance of the base film is lowered. The strength of the coated film of the magnetic layer is, therefore, greatly increased and the adhesiveness and the durability of the magnetic layer are enhanced, thereby enlarging the permitted range of the number ($n_1$) of the coarse protuberances of 0.81 to 1.08 μm in height. However, if the number ($n_1$) of protuberances exceeds 80, the enhanced strength of the coated film solely cannot maintain the high adhesiveness and durability of the magnetic layer and, hence, the durability and the electromagnetic transducing property of the product are unfavorably deteriorated.

It is unfavorable that the number ($n_2$) of protuberances of more than 1.08 μm in height existing on the surface of a base film per area of 25 cm$^2$ exceeds 10, because the separation of the magnetic layer, nonuniformity in coating, etc. are likely to be caused in spite of the improvement of the coated film on the magnetic layer, etc.

The intrinsic viscosity [η] of a film of the present invention is preferably 0.45 to 0.70 in view of the physical properties of the film. It is preparable from the point of view of the strength and the durability that the sum of the $F_5$ values in the machine direction and the transverse direction of the film is preferably not less than 15 kg/cm$^2$, more preferably not less than 18 kg/cm$^2$.

A method of forming a film according to the present invention may now be explained in detail, but the present invention is not restricted thereto so long as the feature of the invention is satisfied.

A raw material containing a polyethylene terephthalate polymer with carbon black particles and fine particles such as kaolin and silica, if necessary, as the main constituent, and a small amount of another polyester as a copolymerizing constituent or a blending constituent, is dried, extruded into a form of a sheet by an extruder ordinarily in a temperature range of 260° to 320° C., and cooled to a temperature of not higher than 80° C. to obtain a substantially shapeless sheet. In this case, a conventional electrostatic cooling method is preferably adopted. The sheet-like product obtained is then stretched in the machine direction and transverse direction to at least 9 times in area magnification to obtain a biaxially oriented film. The thus-obtained film is restretched, if necessary, in the machine and/or transverse direction, and is thereafter heat-treated in a temperature of 180 to 250° C.

During the process, the film may be relaxed by 0.1 to 20% in the transverse direction and the machine direction in the highest temperature zone of the heat treatment and/or the cooling zone at the exit of the heat treatment. The film may also be subjected to two-stage heat treatment.

The thickness of the film obtained by the above-described manner is preferably 5 to 300 μm.

Thus, according to the present invention, it is possible to produce a base film for magnetic recording media which has excellent durability and light-shielding property and which is capable of endowing a high electrical signal characteristic even in the form of a single layer.

As will be obvious from later-described examples, a polyester film for magnetic recording media according to the present invention is very excellent in adhesiveness, light-shielding property, durability and electromagnetic transducing property.

The present invention will be explained in more detail with reference to the following examples, but it is not limited to these examples without departing from the scope of the invention.

The method of measurement of each of the physical properties of the films obtained in the following examples is described in the following.

(1) Light Transmittance

Light transmittance was measured by using an autographic recording spectrophotometer (340 type) manufactured by Hitachi Ltd.

(2) Average Surface Roughness Ra

The surface roughness was obtained in the following manner by using a surface roughness measuring machine (SE-3FK) manufactured by Kosaka Kenkyusho Co., Ltd. The radius of the tip of the probe was 2 μm, and the load was 30 mg. From the curve of the film section a portion of a reference length of L (2.5 mm) was cut out in the direction of the center line. The center line of the cut-out portion is the axis X, the machine direction is the axis Y, and the roughness curve is represented by y=f(x), the surface roughness (μm) is obtained from the following formula:

$$\frac{1}{L} \int_0^L |f(x)| dx$$

Values above 80 μm were cut off. Ra was obtained by the average value at 5 points in the machine direction and 5 points in the transverse direction, namely, at 10 points in total.

(3) Number of Coarse Protuberances

Aluminum was deposited on the surface of the film, and the number of coarse protuberances was measured by using a double beam interference microscope. The number of interference fringes of the third order and the number of interference fringes of the fourth order or higher at a measuring wavelength of 0.54μ were calculated in terms of the numbers per area of 25 cm$^2$, and were represented by $n_1$ and $n_2$, respectively.

(4) Adhesiveness

A double-sided adhesive tape was pasted on a magnetic tape or a floppy disk and a stainless steel sheet so that the coated surface of the magnetic layer comes into contact with the stainless sheet. The film was then peeled off at an angle of 180°, and adhesiveness of the film was represented by the peeling strength at that time, which was, in turn, represented by a relative ratio on the assumption that the adhesive strength of the reference tape was 1.0.

(5) Optical Signal Detecting Property

A floppy disk or a magnetic tape was tried on a actual machine and used for a continuously long time. The frequency of detection error of index holes, a reading tape, etc. was measured. The detecting properties were judged to be A, B and C in the order of frequency of detection error.

(6) Electromagnetic Transducing Property (Floppy Disk)

A floppy disk was tried on a testing machine and it was judged to be acceptable if the initial output voltage was not less than 80% of the reference voltage. If the yield of the acceptable articles is not less than 80%, the electromagnetic transducing property was marked with A, in the case of 60 to 80%, it was marked with B, and in the case of less than 60%, it was marked with C.

(7) Electromagnetic Transducing Property (Magnetic Tape)

A magnetic tape was tried on a VTR machine, and the initial output of the VTR head was measured. If it was equal to that of the reference tape, the electromagnetic transducing property was judged to be A, in the case where it was slightly inferior, it was marked with B, and in the case where it was clearly inferior, it was marked with C.

(8) Durability

A floppy disk or a magnetic tape was used for a continuously long time, and the degradation of the output voltage due to a scuff on the magnetic layer, the separation of the magnetic layer, etc. was measured. The durability was judged to be A, B and C in the order of degradation of the output voltage.

(9) Intrinsic Viscosity $[\eta]$ 1 g of polyester was dissolved in 100 ml of a mixed solvent of phenol/tetrachloroethane in a weight ratio of 50:50, and the intrinsic viscosity was measured at 30° C.

(10) Average Particle Diameter of Carbon Black Particles

A film was cut by a microtome and a photograph was taken by a transmission electron microscope of 75,000 magnifications to measure the average particle diameter of carbon black particles.

In the following examples and comparative examples, "part" represents "part by weight", unless specified otherwise.

EXAMPLES 1 and 2

Production of Polyester Chips 100 parts of dimethyl terephthalate, 70 parts of ethylene glycol, and 0.07 part of calcium acetate hydrate were charged into a reactor and heated to carry out ester exchange reaction, while elevating the temperature and distilling off methanol. The reaction temperature was gradually elevated to 230° C. in about 4.5 hours after the beginning of the reaction, when the ester exchange reaction was substantially completed.

Thereafter, 0.04 part of phosphoric acid and 0.035 part of antimony trioxide were added to the reaction mixture for polymerization by an ordinary method. In other words, the reaction temperature was gradually elevated until it reached 280° C, while the pressure was gradually reduced until it reached 0.5 mm Hg. 4 hours after, the reaction was completed. The reaction product was made into chips by an ordinary method to obtain a polyester having an intrinsic viscosity $[\eta]$ of 0.65. The thus-obtained polyester and carbon black particles having an average diameter of 15 nm were kneaded by a biaxial mixing mill. After the mixture was passed through a filter of approximately 1,000 mesh, it was cut into chips to obtain a master batch having a carbon black concentration of 10 wt % and an intrinsic viscosity $[\eta]$ of 0.60. This master batch was used as a polyester (A).

On the other hand, 100 parts of dimethyl terephthalate, 60 parts of ethylene glycol and 0.09 part of magnesium acetate tetrahydrate were charged into a reactor and heated to carry out ester exchange reaction, while elevating the temperature and distilling off methanol. 4 hours after the beginning of the reaction, the ester exchange reaction was substantially completed. Thereafter, 0.3 wt % of titanium dioxide having an average particle diameter of 0.25 μm which had been dispersed in ethylene glycol and classified and filtered out in advance was added to the reaction mixture. To the mixture, 0.04 part of ethyl acid phosphate and 0.035 part of antimony trioxide were further added. After 4-hour polycondensation, a polyester (B) having an intrinsic viscosity $[\eta]$ of 0.66 was obtained.

100 parts of dimethyl terephthalate, 70 parts of ethylene glycol, 0.10 part of calcium acetate hydrate, and 0.17 part of lithium acetate dihydrate were charged into a reactor and heated to carry out ester exchange reaction, while elevating the temperature and distilling off methanol. The reaction temperature was gradually elevated until it reached 230° C. for 4 hours after the beginning of the reaction, when the ester exchange reaction was substantially completed.

To the reaction product, 0.35 part of triethyl phosphate was added, and further 0.05 part of antimony trioxide was added as a polymerization catalyst. The mixture was polymerized by an ordinary method to obtain a polyester (C). In the thus-obtained polyester (C), a multiplicity of uniform and fine deposited particles containing calcium, lithium and phosphorus elements having an average particle diameter of about 0.5 to 1 μm were observed. The intrinsic viscosity $[\eta]$ of the polyester (C) was 0.65.

Production of a Film

The polyesters (A), (B) and (C) were blended in a composition shown in Table 1 and dried by an ordinary method. The polyester mixture was thereafter extruded and rapidly cooled to obtain an amorphous sheet. A filter of approximately 1,000 mesh was used during extrusion. The amorphous sheet was stretched by 3.6 times in the machine direction at 85° C., and then by 4.0 times in the transverse direction at 110° C. by a tenter. The sheet was next heat-set at 230° C. to obtain a film of 73.5 μm thick. A magnetic layer of 1.5 μm thick was formed on the thus-obtained film to produce a floppy disk. At this time, the carbon black concentration in the magnetic layer was adjusted so that the transmittance ($T_{900}$) of the laminated portion of the magnetic layer and the base film was less than 1%.

Comparative Examples 1 and 2

A master batch (A') containing carbon black was produced in the form of chips in the same way as the polyester (A) in Example 1 except that the filter used at the time of extrusion after kneading was of about 700 mesh. The thus obtained polyester (A') and the polyesters (B) and (C) in Example 1 were blended in a composition shown in Table 1, and formed into a film and processed in the same way as in Example 1 except that the filter used at the time of extrusion was of about 700 mesh, thereby obtaining a floppy disk having a base film of 73.5 μm thick, a magnetic layer of 1.5 μm thick, and a transmittance($T_{900}$) of less than 1%.

Comparative Example 3

The polyesters (B) and (C) in Example 1 were blended in the composition shown in Table 1, and were thereafter formed into a film and processed in the same way as in Example 1 to obtain a floppy disk having a base film of 73.5 μm thick, a magnetic layer of 1.5 μm thick, and a transmittance($T_{900}$) of less than 1%.

The characteristics of the floppy disks in Examples 1 and 2 and Comparative Examples 1, 2 and 3 are shown in Table 1.

ter formed into a film and processed in the same way as in Example 1 except that the filter used at the time of extrusion was of about 1,000 mesh, thereby obtaining a magnetic tape for VTR having a base film of 15 μm thick and a magnetic layer of 4.5 μm thick.

The characteristics of the magnetic tapes in Examples 3 and 4, and Comparative Examples 4, 5 and 6 are shown in Table 2.

From Table 2, it is understood that the films in Examples 3 and 4 are base films for magnetic tapes more excellent in adhesiveness, optical signal detecting property and electromagnetic transducing property than those in Comparative Examples 4, 5 and 6.

TABLE 1

| | Composition of Polyester (part) | | | $T_{900}$ of Base Film (%) | Ra (μm) | $n_1$ (Number/ 25 cm²) | $n_2$ (Number/ 25 cm²) | Carbon Black concentration in Magnetic Layer (wt %) | Adhesive- ness | Optical Signal Detecting Property | Electromagnetic Transducing Property | Durability |
|---|---|---|---|---|---|---|---|---|---|---|---|---|
| | A or A' | B | C | | | | | | | | | |
| Ex. 1 | 1.6 | 80 | 20 | 25 | 0.013 | 25 | 0 | 7 | 1.2 | A | A | A |
| Comp. Ex. 1 | 1.6 | 80 | 20 | 25 | 0.013 | 55 | 6 | 7 | 1.2 | A | B | B |
| Ex. 2 | 2.6 | 60 | 40 | 12 | 0.018 | 55 | 1 | 5 | 1.3 | A | A | A |
| Comp. Ex. 2 | 2.6 | 60 | 40 | 12 | 0.018 | 85 | 12 | 5 | 1.3 | A | C | B |
| Comp. Ex. 3 | 0 | 80 | 20 | 77 | 0.013 | 15 | 0 | 15 | 1.0 | A | A | C |

TABLE 2

| | Composition of Polyester (part) | | | $T_{900}$ of Base Film (%) | Ra (μm) | $n_1$ (Number/ 25 cm²) | $n_2$ (Number/ 25 cm²) | Carbon Black concentration in Magnetic Layer (wt %) | Adhesive- ness | Optical Signal Detecting Property | Electromagnetic Transducing Property | Durability |
|---|---|---|---|---|---|---|---|---|---|---|---|---|
| | A or A' | B | C | | | | | | | | | |
| Ex. 3 | 8 | 92 | 0 | 28 | 0.014 | 18 | 0 | 20 | 1.3 | A | A | A |
| Comp. Ex. 4 | 8 | 92 | 0 | 28 | 0.015 | 50 | 4 | 20 | 1.3 | A | C | B |
| Ex. 4 | 14 | 86 | 0 | 14 | 0.019 | 51 | 1 | 20 | 1.4 | A | A | A |
| Comp. Ex. 5 | 14 | 86 | 0 | 14 | 0.021 | 81 | 7 | 20 | 1.4 | A | C | B |
| Comp. Ex. 6 | 0 | 65 | 35 | 73 | 0.015 | 18 | 0 | 20 | 1.0 | C | A | A |

From Table 1, it is understood that the films in Examples 1 and 2 are base films for floppy disks more excellent in adhesiveness, electromagnetic transducing property and durability than those in Comparative Examples 1, 2 and 3.

EXAMPLES 3 AND 4

The polyesters (A), (B) and (C) were blended in a composition shown in Table 2 by an ordinary method. The mixture was dried, extruded and rapidly cooled to form an amorphous sheet. At this time, a reinforced filter of about 3,000 mesh was used. The amorphous sheet was stretched by 3.8 times in the machine direction at 85° C., then by 4.0 times in the transverse direction at 110° C. by a tenter, and heat set at 220° C. to obtain a film 15 μm in thickness. A magnetic layer of 4.5 μm thick was formed on the film to produce a magnetic tape for VTR while adjusting the carbon black content in the magnetic layer to 10%.

Comparative Examples 4, 5 and 6

The polyesters (B) and (C) in Example 1 and the polyester (A') in Comparative Example 1 were blended in the composition shown in Table 2, and were thereaf-

What is claimed is:

1. A biaxially oriented polyester film for magnetic recording media, containing uniformly dispersed carbon black particles of an average particle diameter of 10 to 30 mm and having the following specific properties:

$$T_{900} \leq 50\% \quad (1)$$

$$0.003 \, \mu m \leq Ra \leq 0.025 \, \mu m \quad (2)$$

$$n_1 \left[ \leq \min \left( 40 \log \frac{80}{T_{900}} \text{ or } 80 \right) \right] = \begin{array}{c} \text{not more than the lesser of} \\ 40 \log \frac{80}{T_{900}} \text{ or } 80 \end{array}$$

$$n_2 \leq 10 \quad (4)$$

wherein $T_{900}$ represents the light transmittance of the film at a wavelength of 900 nm, Ra represents an average surface roughness of the film, $n_1$ represents the number of protuberance of 0.81 to 1.08 μm in height existing on the surface of the film per film area of 25 cm², and $n_2$ represents the number of protuberance of more than 1.08 μm in height existing on the surface of the film per film area of 25 cm$^2$.

2. A biaxially oriented polyester film for magnetic recording media according to claim 1, further containing inert inorganic particles other than the carbon black particles.

3. A biaxially oriented polyester film for magnetic recording media according to claim 2, wherein said inert inorganic particles other than the carbon black particles are titanium oxide particles.

4. A biaxially oriented polyester film for magnetic recording media according to claim 1, wherein Ra is 0.005 to 0.02 μm.

5. A biaxially oriented polyester film for magnetic recording media according to claim 1, wherein $n_2$ is not more than 5.

6. A biaxially oriented polyester film for magnetic recording media according to claim 1, wherein said intrinsic viscosity ($\eta$) of the film is 0.45 to 0.70.

7. A biaxially oriented polyester film for magnetic recording media according to claim 1, wherein the sum of $F_5$ values in the machine direction and the transverse direction of the film is not less than 15 kg/cm$^2$.

8. A biaxially oriented polyester film for magnetic recording media according to claim 1, wherein the content of said carbon black is 0.05 to 5 wt %.

9. A biaxially oriented polyester film for magnetic recording media according to claim 2, wherein average particle diameter of said inert inorganic particles is 0.05 to 5 μm.

10. A biaxially oriented polyester film for magnetic recording media according to claim 3, wherein the average particle diameter of said titanium oxide particles is 0.05 to 3 μm.

11. A biaxially oriented polyester film for magnetic recording media according to claim 1, wherein $n_1$ is not more than the lesser of 40 log $80/T_{900}$ and 60.

* * * * *

UNITED STATES PATENT AND TRADEMARK OFFICE
CERTIFICATE OF CORRECTION

PATENT NO. : 4,865,898

DATED : SEPTEMBER 12, 1989

INVENTOR(S) : FUKUDA ET AL

It is certified that error appears in the above-identified patent and that said Letters Patent is hereby corrected as shown below:

Column 12, line 51, delete "30 mm" and insert --30 nm--.

Signed and Sealed this

Thirteenth Day of August, 1991

*Attest:*

HARRY F. MANBECK, JR.

*Attesting Officer*  *Commissioner of Patents and Trademarks*